United States Patent [19]

Moore et al.

[11] 4,306,180

[45] Dec. 15, 1981

[54] DIRECTIONAL CONTROL SYSTEM

[75] Inventors: John B. Moore, Sedgley; Derek W. Rice, Shifnal, both of England

[73] Assignee: Eaton Corporation, Cleveland, Ohio

[21] Appl. No.: 126,155

[22] Filed: Feb. 29, 1980

[51] Int. Cl.³ .............................................. H02P 1/00
[52] U.S. Cl. ................................... 318/280; 318/256; 318/290; 318/293; 318/139
[58] Field of Search ................. 318/139, 65, 280, 256, 318/290, 293; 307/9, 138, 143

[56] References Cited

U.S. PATENT DOCUMENTS

| 2,098,069 | 11/1937 | Stewart | 318/280 |
| 2,264,993 | 12/1941 | McShane | 318/280 |
| 2,424,859 | 7/1947 | Shoemaker | 318/256 |
| 2,543,450 | 2/1951 | Feagin | 318/280 X |
| 2,990,505 | 6/1961 | Ketchledge | 318/293 X |
| 3,305,718 | 2/1967 | Waldron | 318/293 X |

*Primary Examiner*—Ulysses Weldon
*Attorney, Agent, or Firm*—R. J. McCloskey; F. M. Sajovec, Jr.

[57] ABSTRACT

A circuit for controlling the drive direction of an electrically-driven vehicle, the circuit having a plurality of spring return input switches (20) each actuation of which changes the direction of the vehicle, via a flip-flop circuit (21), an amplifier (22), and a relay (13); the direction contactor coils (10, 11) of the vehicle being connected in alternative circuits through the contacts of the relay (13).

5 Claims, 4 Drawing Figures

DIRECTIONAL CONTROL SYSTEM

This invention relates to a directional control circuit for an electrically-driven vehicle such as a fork lift-truck.

PRIOR ART

Directional control of a fork lift truck is usually achieved by one of two basic systems, namely by providing (a) a three position hand operated switch providing visual indication of the direction of travel selected and a neutral position; or (b) two accelerator pedals for forward and reverse directions respectively.

Neither method is entirely satisfactory. Systems (a) above, involves use of the operator's hand, thus rendering it awkward to reverse the direction of drive, i.e. to use electric braking, and simultaneously operate any of the truck hydraulic functions whilst retaining adequate control of steering of the truck. System (b) above, does not suffer from the above disadvantage; however, with an unfamiliar or inexperienced operator incorrect operation can result, since this method is so different from normal automotive practice.

It is an object of the present invention to provide a simple and effective directional control circuit that does not suffer from the aforementioned disadvantages.

The present invention is a circuit for controlling the drive direction of an electrically-driven vehicle, the circuit comprising forward and reverse contactor coils controlling the drive direction, and characterized by a relay having a coil and contacts to which the contactor coils are connected in alternative circuits for energization, and an input switch controlling energization of the relay coil.

DRAWINGS

An embodiment of the present invention will now be described, by way of example, with reference to the accompanying drawing, in which.

SPECIFIC EMBODIMENT

Figure 1:
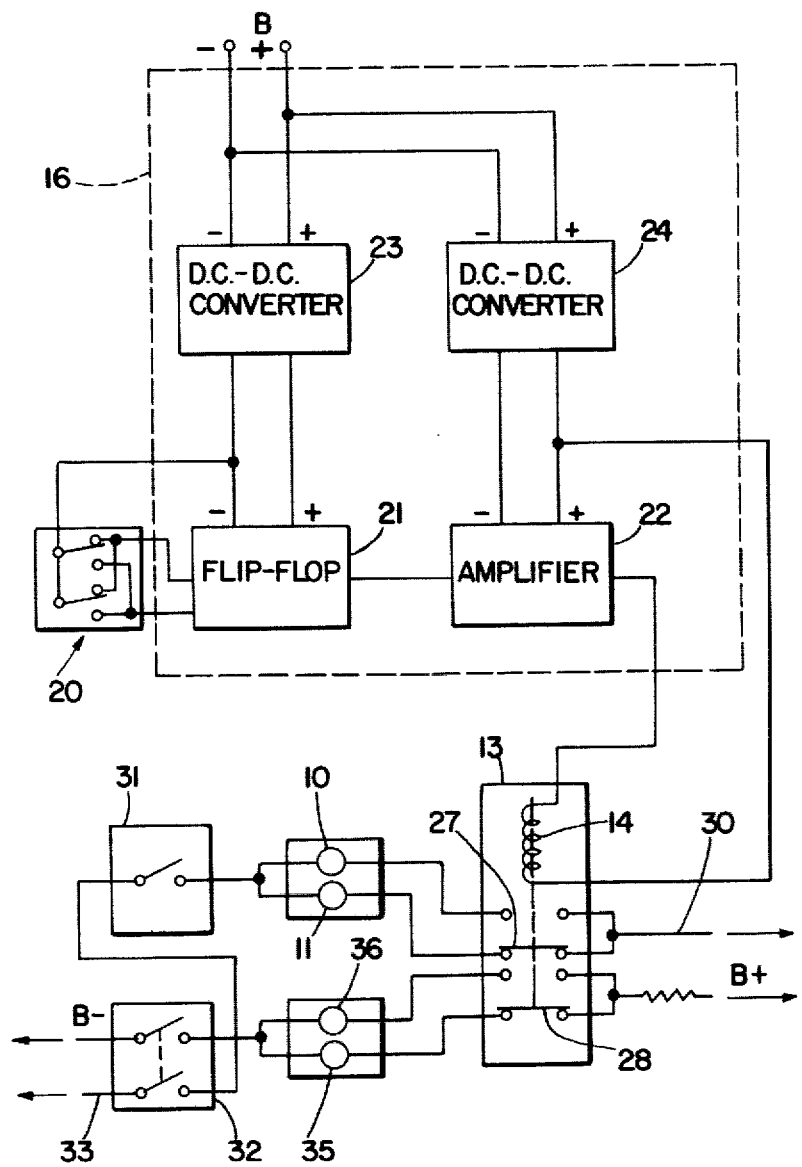
FIG. 1 is a block diagram of part of a first embodiment of a drive control system of a fork-lift truck.

Referring now to FIG. 1, a circuit according to the present invention for controlling the drive direction of a fork-lift truck consists essentially of contactor coils 10 and 11, energization of which determines the direction of drive; relay 13 controlling energization of the coils 10 and 11; a power supply circuit 16 for the coil 14 of the relay 13; and control switches 20 for supplying control signals to the circuit 16. It will, of course, be understood that the circuit illustrated in FIG. 1 is not the complete drive control circuit for the truck and that in particular there are not shown in FIG. 1 the drive motor, its field circuits in which are located the contacts associated with the contactor coils 10 and 11, and the controller by means of which the output power of the main drive motor is regulated. All these are, however, well known in principle and the details of them are not relevant to the present invention.

The power supply 16 is connected to the terminals B+ and B− of the main battery of the fork-lift truck and comprises a D-type flip-flop 21 whose output is connected to an amplifier 22 which in turn controls the energization of the relay coil 14. In the embodiment illustrated DC-DC converters 23 and 24 are provided between the battery terminals and the flip-flop 21 and amplifier 22 respectively to ensure appropriate supply voltages for the flip-flop and amplifier. The switches 20, as will be described in more detail later, are spring return switches connected in parallel to the signal input of the flip-flop so that actuation of any one of the switches 20 causes the flip-flop 21 to change its output. The output of the flip-flop 21 is either zero or a voltage which, after amplification by amplifier 22, is sufficient to operate the relay 13; thus actuation of any one of the switches 20 changes the energization of the relay coil 14 from the energized state to the de-energized state or vice versa, depending only on the state of energization of the coil when the switch 20 is actuated.

The contacts of the relay 13 comprise two pairs of normally open contacts, two pairs of normally closed contacts, and two movable contacts 27 and 28 which bridge respective pairs of the normally closed contacts when the relay coil is, as illustrated, not energized and repsective pairs of the normally open contacts when the relay coil 14 is energized.

The contact 27 bridges the normally closed pair of contacts as illustrated in a circuit comprising, in series, the controller (not illustrated), a conductor 30, the contact 27, the contactor coil 11 (the reverse contactor coil), a footswitch 31 in the accelerator pedal of the truck, first contacts of a neutral switch 32, a conductor 33 and the controller. When the relay 13 is energized the contact 27 bridges a normally open pair of contacts to substitute the contactor coil 10, the forward contactor coil, for the reverse contactor coil 11 in the above circuit.

Similarly, the movable contact 28 co-operates with normally closed or normally open contacts to connect reverse or forward indicator lamps 35 and 36 respectively in a circuit across the main battery terminals and including a dropping resistor and second contacts of the neutral switch 32.

It can now be seen that when the relay 13 is not energized, assuming the neutral switch 32 to be closed, the reverse indicator lamp 35 is energized and the reverse contactor coil 11 is energized if the footswitch 31 is closed, i.e. the circuit is set for the reverse movement of the truck. Similarly when the relay 13 is energized, the circuit is set up for forward movement of the truck.

Thus, in operation, when the truck operator wishes to change the direction of drive he need only actuate any one of the switches 20 long enough to toggle the flip-flop 21. When he wishes to revert to his original direction of drive, again all that is needed is a brief actuation of any one of the switches.

Figure 2:
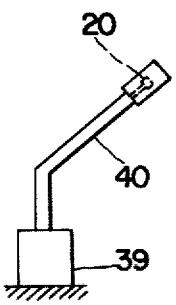
FIG. 2 is a view in elevation of an hydraulic function operating lever.
Figure 3:
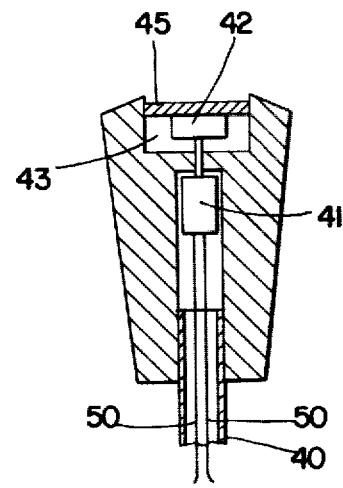
FIG. 3 is an enlarged section of part of FIG. 2.

Fork-lift trucks are generally provided with a number of function control levers, typically as illustrated at 40 in FIG. 2. Each lever 40 is associated with an hydraulic valve block 39 and in this embodiment a switch 20 is built into the top end of the control lever, as seen in more detail in FIG. 3. The body 41 of the switch 20 is secured in position at the top of the lever 40 while the push-button spring biased switch actuator 42 is located in a recess 43 in the knob 44 at the end of the lever to prevent inadvertant operation of the switch. A flexible membrane 45, in this embodiment of rubber, seals the recess 43 against the ingress of dust and moisture. The switch is connected to the rest of the control circuit of FIG. 1 by cables 50 extending from the switch down the lever 40.

It can be seen that with the arrangement described, the truck operator can change the drive direction of his vehicle using the same hand that is already involved in controlling one of the vehicle's hydraulic functions, leaving his other hand in full control of steering.

Modifications may be made to the embodiment described. In particular the circuit between the switches 20 and the relay coil 14 in a number of ways, it being necessary only that the switches 20 control the energization of the coil.

Figure 4:
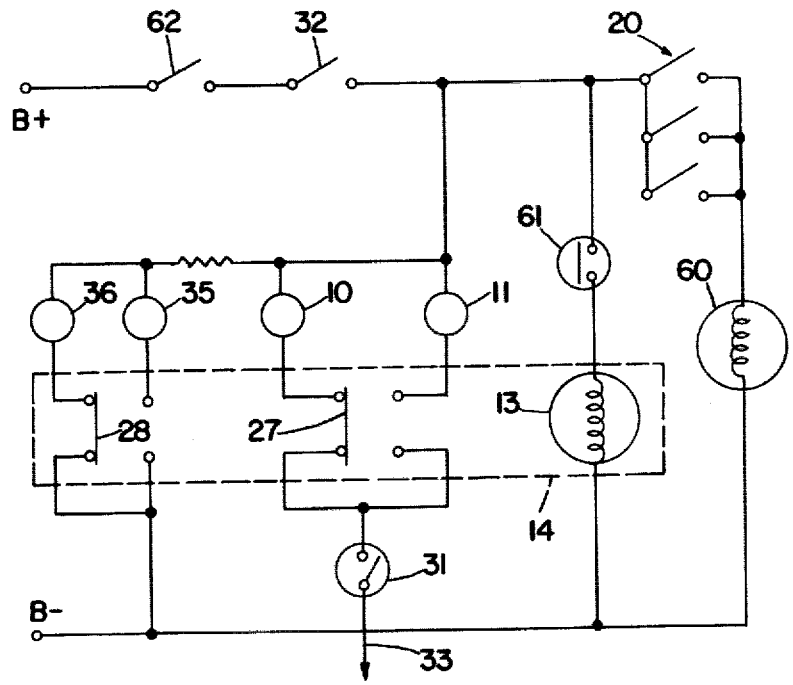
FIG. 4 is a block diagram of part of a second embodiment of a drive control according to the present invention.

In the embodiment illustrated in FIG. 4, for example, in which the same reference numerals as in FIG. 1 have been used to denote corresponding circuit elements, the flip-flop 21 and amplifier 22 of FIG. 1 have been replaced by a latching relay having its coil 60 connected between the fixed contacts of the switches 20 and the battery terminal B— and its normally open contact 61 in series with the coil 13 of the relay 14. The switch 62 is the conventional key-switch provided in fork-lift trucks.

Assuming that the switches 62 and 32 are closed, the operation of the embodiment of FIG. 4 is the same as that of FIG. 1. Each closure of a switch 20 will change the condition of the contacts 61 of the latching relay and hence the energization of the relay 14 to determine which of the contactor coils 10 and 11 is at any time energization via the footswitch 31.

It should also be noted that electrical braking can be achieved by actuating any of the switches 20 to change the drive direction while the vehicle is moving. Also when either the keyswitch 62 or the neutral switch 32 are opened, as for example when the driver leaves the vehicle, and subsequently closed, the control circuit is automatically put in condition for forward movement of the vehicle.

What is claimed is:

1. In a circuit for controlling the drive direction of an electrically driven vehicle, the circuit comprising forward and reverse contactor coils controlling the drive direction, contact means movable between a first position energizing said forward contactor coil and a second position energizing said reverse contactor coil, a relay coil having a movable core member connected to said contact means and operable to move said contact means to one of said first or second positions when said relay coil is energized and to the other of said first or second positions when said relay coil is deenergized, and an input switch controlling energization of the relay coil; the improvement comprising a flip-flop circuit controlled by said input switch and having an input connected to a voltage source and an output connected to said relay coil, said flip-flop circuit having a first output level sufficient to energize said relay coil and a second output level insufficient to energize said relay coil, said first and second output levels of said flip-flop circuit being selected alternately each time said input switch is closed.

2. Apparatus as claimed in claim 1, including a pair of direction indicator lamps responsive to the energization and deenergization of said relay coil to indicate the drive direction selected.

3. Apparatus as claimed in claim 1, in which said input switch is a spring return switch.

4. Apparatus as claimed in claim 3, in which said vehicle has at least one hydraulic function operating lever, said input switch being mounted at the end of said operating lever.

5. Apparatus as claimed in claim 4, in which said input switch is recessed in the end of said lever.

* * * * *